United States Patent [19]

Morimoto

[11] Patent Number: 5,502,708
[45] Date of Patent: Mar. 26, 1996

[54] OPTICAL SCANNING DEVICE

[75] Inventor: Yasuaki Morimoto, Shiba, Japan

[73] Assignee: Deutsche Thomson-Brandt GmbH, Villengen-Schwenningen, Germany

[21] Appl. No.: 244,707

[22] PCT Filed: Nov. 28, 1992

[86] PCT No.: PCT/EP92/02761

§ 371 Date: Sep. 12, 1994

§ 102(e) Date: Sep. 12, 1994

[87] PCT Pub. No.: WO93/12523

PCT Pub. Date: Jun. 24, 1993

[30] Foreign Application Priority Data

Dec. 11, 1991 [DE] Germany .......................... 41 40 806.3

[51] Int. Cl.[6] ............................................... G11B 7/00
[52] U.S. Cl. .............................. 369/110; 369/120; 369/13; 369/44.41; 360/114
[58] Field of Search ............................ 369/13, 107, 109, 369/110, 124, 116, 105, 120, 44.39, 44.41; 360/114

[56] References Cited

U.S. PATENT DOCUMENTS

| | | | |
|---|---|---|---|
| 4,682,315 | 6/1987 | Uejima ...................... | 369/110 |
| 4,695,158 | 9/1987 | Kotaka et al. ............. | 369/120 |
| 4,845,701 | 7/1989 | Nakata ...................... | 369/120 |
| 4,972,400 | 11/1990 | Kuwabara et al. ....... | 369/120 |
| 5,093,822 | 3/1992 | Kugiya et al. ............. | 369/109 |
| 5,105,399 | 4/1992 | Shimonou .................. | 369/110 |
| 5,124,868 | 6/1992 | Matsubayashi et la. .. | 369/110 |
| 5,189,650 | 2/1993 | Watanabe et al. ........ | 369/110 |
| 5,325,350 | 6/1994 | Morimoto et al. ........ | 369/110 |

FOREIGN PATENT DOCUMENTS

| | | |
|---|---|---|
| 3732874 | 4/1989 | Germany . |
| 60-234235 | 11/1985 | Japan . |
| 1-88943 | 4/1989 | Japan . |

OTHER PUBLICATIONS

Applied Optics, vol. 25, No. 22, Nov. 1986, Kenji Torazawa et al., "Erasable digital audio disk system" pp. 3990–3995.
Patent Abstracts of Japan, vol. 13, No. 322, p. 902, Apr. 3, 1989 and Japanese Pat. No. 1–88943 *(listed above).
Patent Abstracts of Japan, vol. 10, No. 102, p. 448, Nov. 20, 1985 and Japanese Pat. No. 60–234235 *(listed above).

Primary Examiner—Loha Ben
Attorney, Agent, or Firm—Joseph S. Tripoli; Eric P. Herrmann; James B. Hayes

[57] ABSTRACT

In a combined optical and magneto-optical recorder, data stored in pits and a magnetic layer may be simultaneously detected with an optical scanning device. Reflected light is divided by a polarizer and directed to one of two photodetectors depending on the polarization of the reflected light. A magneto-optic recorded data signal (containing cross-talk) is detected by differencing the signals provided by the two photodetectors. Reflected light is also directed through a λ/4 polarizer and a second beam divider to third and fourth photodetectors depending upon the polarization of the light passing the λ/4 polarizer. A second difference signal, which essentially conforms to the cross-talk, is generated from the differences of signals provided by the third and fourth photodetectors. The two difference signals are combined to produce a cross-talk free magneto-optic recorded data signal.

19 Claims, 3 Drawing Sheets

OPTICAL SCANNING DEVICE

The present invention relates to an optical scanning device which is suitable for reading both an optical and a magneto-optic recording medium as well as a combined magneto-optic recording medium upon which items of data are stored on top of one another in both a magnetic layer and by means of so-called pits, wherein the light beam from a light source is focused on the recording medium and is reflected from the recording medium through a first $\lambda/2$ plate to a first polarization beam splitter which guides the light beam onto a first or second photodetector, wherein the output of the first and of the second photodetector are connected to the inputs of a first differential amplifier.

BACKGROUND OF THE INVENTION

A known optical recording medium is, for example, the CD disc in which a light reflecting aluminum layer follows on the transparent layer. The light reflecting aluminum layer has depressions, so-called pits, which represent the items of data stored on the CD disc. The items of data are readable from the CD disc by means of an optical scanning device because the reflective behaviour of the light reflecting aluminum layer depends on the pattern which the depressions form on the disc. Less light is reflected from a depression, frequently also called a groove, than from a raised area which is often also referred to as a land.

From the intensity of the light reflected from the CD disc, the optical scanning device therefore recognizes whether the scanned bit relates for example, to a logical one or a logical zero.

A further optical recording medium of this type, known under the designation of a magneto-optic disc, is described in the article "Magnetooptische Versuche dauern an" in Funkschau 13, 20th Jun. 1986 at pages 37–41.

In contrast to a conventional CD disc, a magneto-optic disc does not have any pits. A magnetic layer, in which items of data are recordable and from which items of data are readable, is located behind the transparent layer. It will now be explained how items of data are written onto a magneto-optic disc.

The magnetic layer is heated above the Curie temperature by means of a laser beam focused onto the disc. Usually however, it is only necessary to heat up the magnetic layer to the compensation temperature which lies somewhat under the Curie temperature. An electromagnet, which magnetizes the region heated by the laser beam in the one or the other direction of magnetization, is arranged behind the focal point on the disc. Because, after switching off the laser beam, the heated spot cools once more below the Curie temperature, the direction of magnetization determined by the electromagnet is maintained: it is, so to speak, frozen in. The individual bits are stored in this manner in domains of different directions of magnetization. Thereby, the one direction of magnetization of a domain corresponds, for example, to a logical one, while the opposite direction of magnetization represents a logical zero.

One makes use of the Kerr effect for reading the items of data. The plane of polarization of a linearly polarized light beam is rotated by the reflection at a magnetized mirror by a measurable angle. In dependence upon the direction in which the mirror is magnetized, the plane of polarization of the reflected light beam is rotated to the right or to the left. However, because the individual domains on the disc act like magnetized mirrors, the plane of polarization of a scanning light beam is rotated by a measurable angle to the left or to the right in dependence upon the direction of magnetization of the currently scanned domain.

The optical scanning device recognizes which bit is present, a logical one or a logical zero, from the rotation of the plane of polarization of the light beam reflected from the disc. In contrast to a CD disc having pits, a magneto-optic disc is erasable and re-writable virtually as often as desired.

A disc shaped recording medium which represents a combination of an optical and a magneto-optic disc is known from DE-OS 37 32 875. Items of data are stored on this recording medium by means of pits and also in the magnetic layer of the disc. Because the pits and the magnetic domains lie above one another, items of data are stored at one and the same place in the form of pits as well as in the magnetic layer. The storage capacity of this disc is therefore twice as great as that of a normal optical disc or a magneto-optic disc.

An optical scanning device is discussed in the DE-OS 37 32 874 which is suitable for the three types of disc mentioned, since this optical scanning device is able to read items of data from an optical disc, e.g. a compact disc, a magneto-optic disc as well as from a disc that is known from the DE-OS 37 32 875.

In this optical scanning device, the light from a laser is focused onto the disc and reflected from there to a polarization beam splitter which, in dependence on its direction of polarization, reflects it either onto a first or a second photodetector. The data signal, which is stored in the magnetic domains of the disc, is obtained from the difference of the photo voltages of the first and the second photodetector. That data signal, which reproduces the items of data stored on the disc by means of the pits, is produced from the sum of the photo voltages of the first and the second photodetector. The optical scanning device described in DE-OS 37 32 874 may, in a disc such as is specified in DE-OS 37 32 875, simultaneously read both the items of data stored by means of the pits and the items of data stored in the magnetic domains.

However, because the pits likewise cause a—if only very small—rotation of the direction of polarization of the light emitted by the laser, cross-talk between the data signal obtained by scanning the pits and the data signal read from the magnetic domains with the aid of the Kerr effect cannot be completely avoided.

The object of the invention therefore is to suppress the undesired cross-talk as completely as possible using simple means.

SUMMARY OF THE INVENTION

The invention achieves this object in that, the recording medium reflects the light beam through a second $\lambda/2$ plate and a $\lambda/4$ plate to a second polarization beam splitter which guides the light beam in dependence on its direction of polarization onto a third or fourth photodetector, that the output of the third and that of the fourth photodetector are connected to the inputs of a second differential amplifier, that the output of the first differential amplifier is connected to the non-inverting input of a third differential amplifier from whose output the data signal which was obtained from the magnetic layer of the recording medium is derivable and that the output of the second differential amplifier is connected to the inverting input of the third differential amplifier.

BRIEF DESCRIPTION OF THE DRAWINGS

There is shown in

DETAILED DESCRIPTION

Figure 1:
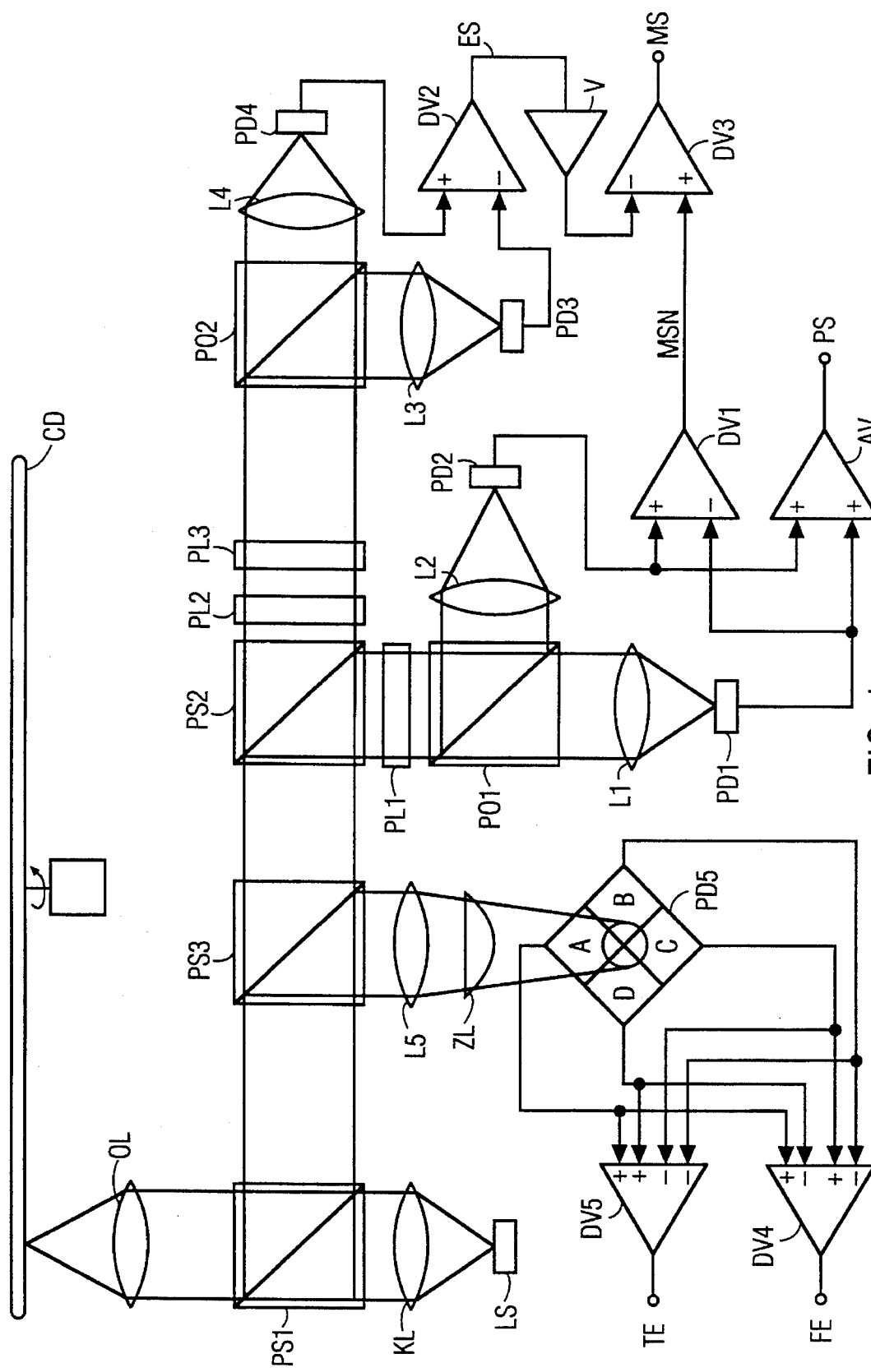
FIG. 1 an embodiment of the invention.

The construction of the embodiment shown in FIG. 1 will now be described.

The light produced by a light source, for example, a laser LS, shines through a collimating lens KL, a prismatic beam splitter PS1 and an objective lens OL onto a magneto-optic recording medium CD on which the items of data are stored on top of each other in a magnetic layer and by means of pits. The light beam is focused onto the disc-like magneto-optic recording medium CD, which will be subsequently referred to as magneto-optic discs, by means of the objective lens OL.

The magneto-optic disc CD reflects the light beam back to the objective lens OL and to the prismatic beam splitter PS1 which deflects it through a right angle to a prismatic beam splitter PS3. The prismatic beam splitter PS3 deflects one light beam through a right angle which then passes through a lens L5 and a cylindrical lens ZL onto a four quadrant photodetector PD5 which is formed by four photo diodes A, B, C and D. A light beam passes on in a straight line through the prismatic beam splitter PS3 to a prismatic beam splitter PS2 and then further through a λ/2 plate and a λ/4 plate to a polarization beam splitter PO2. A light beam is deflected through a right angle by the prismatic beam splitter PS2 to a λ/2 plate from which the light beam passes on further to a polarization beam splitter PO1. The polarization beam splitter PO1 guides the light beam in dependence on its direction of polarization either through a lens L1 to a photodetector PD1 or through a lens L2 to a photodetector PD2. The polarization beam splitter PO2 directs the light beam coming from the λ/4 plate in dependence on its direction of polarization either through a lens L3 to a photodetector PD3 or through a lens L4 to a photodetector PD4.

The outputs of the two diagonally opposite photodiodes A and C of the four quadrant photodetector PD5 are connected to a respective summing input of a differential amplifier DV4, while the other two diagonally opposite photodiodes B and D are connected to the subtracting inputs of the differential amplifier DV4. The two adjacent photodiodes A and D of the four quadrant photodetector PD5 are connected to the two summing inputs of a fifth differential amplifier DV5; the other two adjacent photodiodes C and B of the four quadrant photodetector PD5 are connected to the subtracting inputs of the differential amplifier DV5.

The output of the first photodetector PD1 is connected to the inverting input of a differential amplifier DV1 and to the first input of a summing amplifier AV. The output of the photodetector PD2 is connected to the non-inverting input of the differential amplifier DV1 and to the second input of the summing amplifier AV.

The output of the photodetector PD3 is connected to the inverting input of a differential amplifier DV2, whose non-inverting input is connected to the output of the photodetector PD4. The output of the differential amplifier DV2 is connected to the input of an amplifier V whose output is connected to the inverting input of a differential amplifier DV3. The output of the differential amplifier DV1 is connected to the non-inverting input of the differential amplifier DV3.

Figure 2:
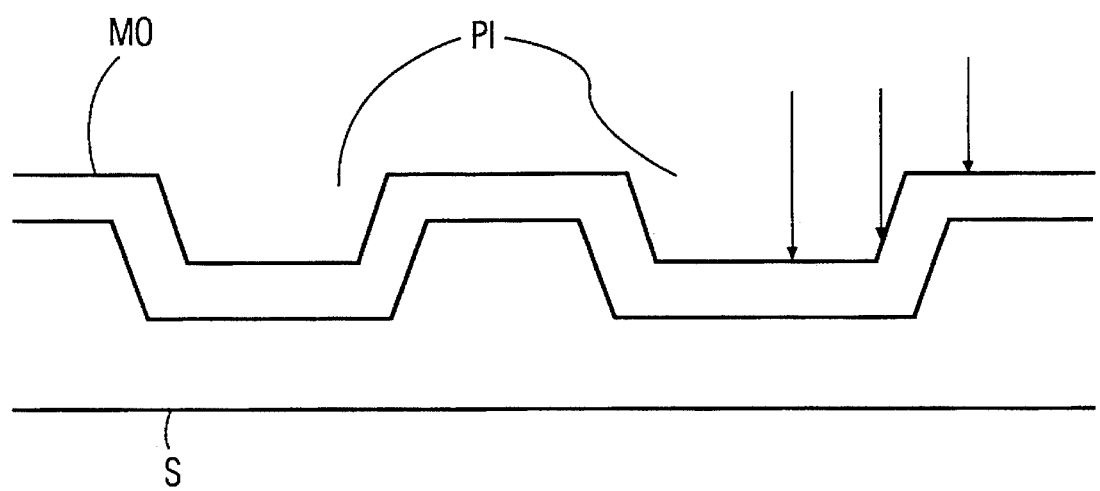
FIG. 2 a cross-section through a magneto-optic disc having pits.

The manner in which the cross-talk is created will be explained with the aid of the cross-section through a magneto-optic recording medium, which is shown in FIG. 2, on which items of data are stored on top of each other in a magnetic layer as well as by means of pits.

A substrate layer is arranged on the magneto-optic disc behind a magneto-optic layer. However, the magneto-optic layer is not plane as in a conventional magneto-optic disc, but rather, it contains depressions, so-called pits, which serve for the storage of data as in an optical compact disc. If now, the linearly polarized light emitted by the laser is reflected at the magneto-optic layer MO of the disc, its direction of polarization will be rotated through a small angle either to the right or to the left in dependence on the direction of magnetization of the magneto-optic layer as a result of the Kerr effect. However, elliptically polarized light is produced upon reflection at the edges of the pits, which is what causes the cross-talk in the magneto-optic data signal.

As explained above, the light beam reflected from the disc is directed by the polarization beam splitter PO1 either onto the photodetector PD1 or onto the photodetector PD2 in dependence on its direction of polarization. The magneto-optic data signal MSN, which reproduces the items of data stored in the magnetic layer MO of the CD disc, is thus generated by forming the difference between the output signals of the two photodetectors PD1 and PD2 in the differential amplifier DV1.

The data signal PS, which reproduces the items of data stored by means of the pits in the disc, is obtained by addition of the output signals of the two photodetectors PD1 and PD2.

Figure 3:
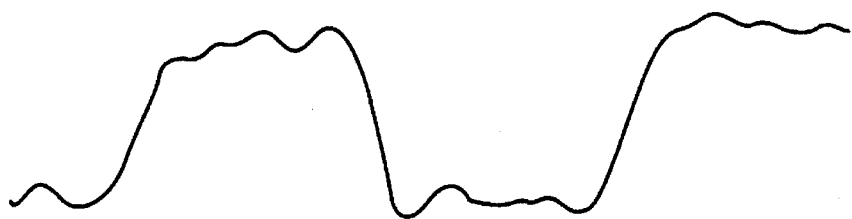
FIG. 3 the magnet-optic data signal which is subject to cross-talk.

The magneto-optic data signal MSN present at the output of the differential amplifier DV1 which is shown in FIG. 3 is, however, still subject to the interfering cross-talk.

Now the invention is based on the perception that a λ/4 plate converts linearly polarized light into elliptically polarized light. The light reflected by the compact disc, which on the one hand is linearly polarized in a particular plane in dependence on the direction of magnetization of the magnetic layer, and which on the other hand also contains elliptically polarized components as a result of the reflection at the edges of the pits, shines on the prismatic beam splitter PS2 which guides it not only to the polarization beam splitter PO1 but also via the λ/2 plate PL2 and the λ/4 plate PL3 to the polarization beam splitter PO2. The λ/4 plate PL3 converts the linearly polarized component of the light, which represents the magneto-optic data signal, into elliptically polarized light. The elliptically polarized component of the light, which is caused by the reflection at the edges of the pits, is, in contrast, converted into virtually linearly polarized light. The polarization beam splitter PO2 guides the light either onto the photodetector PD3 or PD4 in dependence on its direction of polarization.

Figure 4:
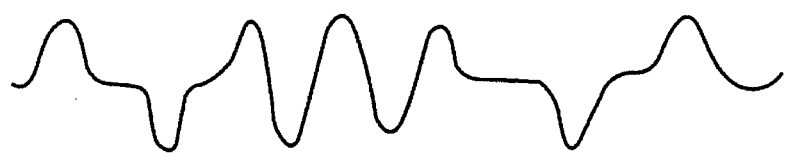
FIG. 4 the interfering cross-talk signal.

The signal ES, which is produced by the difference between the output signals of the two photodetectors PD3 and PD4 by means of the differential amplifier DV2, is shown in FIG. 4. Because the magneto-optic data signal is suppressed to a large extent in the signal ES, the signal ES is the interference signal which is causing the cross-talk.

Figure 5:
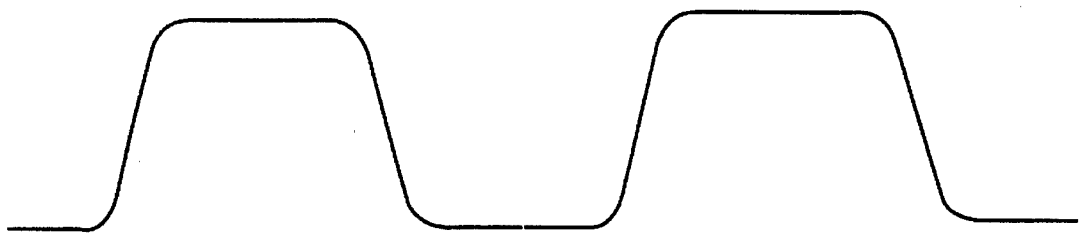
FIG. 5 the magneto-optic data signal which is free of cross-talk.

Consequently, by subtraction of the signal ES from the signal MSN in the differential amplifier DV3, a magneto-optic data signal MS, which is completely free of cross-talk and which reproduces the items of data stored in the magnetic layer MO of the CD disc, is produced at the output of the differential amplifier DV3. The magneto-optic data signal MS, which is free of cross-talk, is depicted in FIG. 5.

The amplification of the amplifier V, which serves for matching the circuit arrangement consisting of the differential amplifiers DV1, DV2 and DV3, can be determined experimentally for example. The amplification of the amplifier V has to be altered until such time as the signal MS at the output of the differential amplifier DV3 exhibits rectangular pulses having steep edges.

The cross-talk of a disc is dependent upon how great the component of the elliptically polarized light is in the light reflected from the disc. The greater the component of the elliptically polarized light, the greater the cross-talk. However, because the component of the elliptically polarized light varies from disc to disc in dependence on the quality of the disc, the discs exhibit differing degrees of cross-talk.

Consequently, one embodiment of the invention provides for measuring the slope of the edges of the signal MS at the output of the differential amplifier DV3 and regulating the amplification of the amplifier V such that the slope of the edges is a maximum when reading a disc. Due to this measure, the amplification of the amplifier V is optimally matched to the specific reflective properties of the disc which is currently being scanned. Consequently, the cross-talk is optimally eliminated for each disc in dependence on the reflective properties of the discs.

The invention is suitable for an optical recording and/or reproduction device which can read both optical and magneto-optic recording media as well as a combination of both. The invention can be advantageously used for data processing because items of data can be simultaneously read and recorded. However, the invention also offers the advantage for example, that sound and pictures can be recorded in CD players and video disc players simultaneously with the reproduction.

I claim:

1. Optical scanning device which is suitable for reading both an optical and a magneto-optic recording medium as well as a magneto-optic recording medium (CD) upon which items of data are stored on top of one another in both a magnetic layer (MO) and by means of pits (P), wherein the light beam from a light source (LS) is focused on the recording medium (CD) and is reflected by the recording medium (CD) through a first λ/2 plate (PL1) to a first polarization beam splitter (PO1) which guides the light beam in dependence on its direction of polarization onto a first or second photodetector (PD1, PD2), wherein the output of the first and of the second photodetector (PD1, PD2) are connected to respective inputs of a first differential amplifier (DV1), said scanning device further comprising:

a second (DV2) and a third (DV3) differential amplifier having respective inverting and non-inverting input connections and respective output connections, the output connection of the first (DV1) and second (DV2) differential amplifiers being respectively coupled to the non-inverting and inverting input connections of the third (DV3) differential amplifier from whose output connection a substantially crosstalk free data signal (MS) obtained from the magnetic layer MO of the recording medium is available;

third (PD3) and fourth (PD4) photodetectors respectively connected to the inverting and non-inverting input connections of the second (DV2) differential amplifier;

a second polarization beam splitter (PO2) arranged to direct light reflected from the recording medium, in dependence on its direction of polarization, onto said third (PD3) and fourth (PD4) photodetectors; and a second λ/2 plate (PL2) and a λ/4 plate (PL3) arranged in an optical path of said reflected light between said recording medium and said second polarization beam splitter (PO2).

2. The optical scanning device set forth in claim 1, further comprising an equalizing amplifier (V) coupled between the second differential amplifier (DV2) and the third differential amplifier (DV3).

3. The optical scanning device set forth in claim 2, wherein the amplifier (V) has a gain function set such that the slope of the transitions in the signal (MS) at the output of the third differential amplifier (DV3) attains a predetermined threshold value or is a maximum.

4. The optical scanning device set forth in claim 3, wherein the gain function of the amplifier (V) is automatically altered until such time as the slope of the transitions in the signal (MS) at the output of the third differential amplifier (DV3) attains the predetermined threshold value or is a maximum.

5. The optical scanning device set forth in claim 2, wherein the equalizing amplifier (V) has a gain set such that the slope of the transitions in the signal (MS) at the output of the third differential amplifier (DV3) attains a predetermined threshold value or is a maximum.

6. The optical scanning device set forth in claim 1 further comprising:

a collimating lens (KL), a first prismatic beam splitter (PS1), and an objective lens (OL) arranged to focus a light beam from said light source onto the recording medium (CD), and to direct light reflected from said magneto-optic recording medium (CD) to a second prismatic beam splitter (PS2), said second prismatic beam splitter (PS2) being arranged to direct said reflected light onto the first photodetector (PD1) via an optical path including the first λ/2 plate (PL1), the first polarization beam splitter (PO1), and a first lens (L1) and also to direct said reflected light onto the fourth photodetector (PD4) via an optical path including the second λ/2 plate (PL2), the λ/4 plate (PL3), the second polarization beam splitter (PO2), and a fourth lens (L4);

a second lens (L2) in an optical path between said first polarization beam splitter (PO1) and said second photodetector (PD2) for focusing said reflected light on said second photodetector;

a third lens (L3) in an optical path between said second polarization beam splitter (PO2) and said third photodetector (PD3) for focusing said reflected light on said third photodetector;

respective means for electrically coupling the first (PD1) and second (PD2) photodetectors to the inverting and non-inverting input connections respectively, of the first differential amplifier;

respective means for electrically coupling the third (PD3) and fourth (PD4) photodetectors to the inverting and non-inverting input connections respectively, of the second differential amplifier; and an amplifier (V), for coupling the output of the second differential amplifier (DV2) to the inverting input of the third differential amplifier (DV3).

7. The optical scanning device set forth in claim 6 further comprising:

a fifth lens (L5) and a cylindrical lens (ZL);

a four-quadrant photodetector (PD5);

a third prismatic beam splitter (PS3), in an optical path between the first prismatic beam splitter (PS1) and the second prismatic beam splitter (PS2), and arranged to direct a light beam via said fifth lens (L5) and said cylindrical lens (ZL) onto said four-quadrant photodetector (PD5).

8. The optical scanning device set forth in claim 7, wherein respective output connections of two diagonally opposite photodiodes (A and C or B and D) of said four-quadrant photodetector are respectively connected to two summing inputs or subtracting inputs respectively of a fourth differential amplifier (DV4) from whose output a focusing error signal (FE) for a focusing control loop is derivable.

9. The optical scanning device set forth in claim 8, further comprising:

a fifth differential amplifier (DV5);

respective means for coupling output connections of a first pair of diagonally opposite photodiodes of said four quadrant photodetector to a first pair of inverting and non-inverting input connections of said fifth differential amplifier (DV5);

respective means for coupling output connections of a second pair of diagonally opposite photodiodes of said four quadrant photodetector to a second pair of inverting and non-inverting input connections of said fifth differential amplifier (DV5).

10. The optical scanning device set forth in claim 8, wherein respective output connections of the first photodetector (PD1) and the second photodetector (PD2) are connected to respective input connections of a summing amplifier (AV) from whose output a data signal (PS) obtained from the pits of the recording medium (CD) is derivable.

11. The optical scanning device set forth in claim 7, further comprising:

a fifth differential amplifier (DV5);

respective means for coupling output connections of a first pair of diagonally opposite photodiodes of said four quadrant photodetector to a first pair of inverting and non-inverting input connections of said fifth differential amplifier (DV5);

respective means for coupling output connections of a second pair of diagonally opposite photodiodes of said four quadrant photodetector to a second pair of inverting and non-inverting input connections of said fifth differential amplifier (DV5).

12. The optical scanning device set forth in claim 11, wherein respective output connections of the first photodetector (PD1) and the second photodetector (PD2) are connected to respective input connections of a summing amplifier (AV) from whose output a data signal (PS) obtained from the pits of the recording medium (CD) is derivable.

13. The optical scanning device set forth in claim 6, wherein respective output connections of the first photodetector (PD1) and the second photodetector (PD2) are connected to respective input connections of a summing amplifier (AV) from whose output a data signal (PS) obtained from the pits of the recording medium (CD) is derivable.

14. The optical scanning device set forth in claim 6, wherein the amplifier (V) has a gain function set such that the slope of the transitions in the signal (MS) at the output of the third differential amplifier (DV3) attains a predetermined threshold value or is a maximum.

15. The optical scanning device set forth in claim 7, wherein respective output connections of the first photodetector (PD1) and the second photodetector (PD2) are connected to respective input connections of a summing amplifier (AV) from whose output a data signal (PS) obtained from the pits of the recording medium (CD) is derivable.

16. The optical scanning device set forth in claim 7, wherein the amplifier (V) has a gain function set such that the slope of the transitions in the signal (MS) at the output of the third differential amplifier (DV3) attains a predetermined threshold value or is a maximum.

17. The optical scanning device set forth in claim 1, wherein respective output connections of the first photodetector (PD1) and the second photodetector (PD2) are connected to respective input connections of a summing amplifier (AV) from whose output a data signal (PS) obtained from the pits of the recording medium (CD) is derivable.

18. The optical scanning device set forth in claim 1 further comprising:

a further lens (L5) and a cylindrical lens (ZL);

a four-quadrant photodetector (PD5);

a prismatic beam splitter (PS3), in an optical path of reflected said light beam, and arranged to direct a portion of said light beam via said further lens (L5) and said cylindrical lens (ZL) onto said four-quadrant photodetector (PD5).

19. The optical scanning device set forth in claim 18, wherein respective output connections of two diagonally opposite photodiodes (A and C or B and D) of said four-quadrant photodetector are respectively connected to two summing inputs or subtracting inputs respectively of a fourth differential amplifier (DV4) from whose output a focusing error signal (FE) for a focusing control loop is derivable.

* * * * *